United States Patent [19]

Goldburg et al.

[11] Patent Number: 5,625,880

[45] Date of Patent: Apr. 29, 1997

[54] SPECTRALLY EFFICIENT AND HIGH CAPACITY ACKNOWLEDGEMENT RADIO PAGING SYSTEM

[75] Inventors: Marc H. Goldburg, Redwood City; Richard H. Roy, III, Cupertino; Martin Cooper; Arlene J. Harris, both of Del Mar, all of Calif.

[73] Assignee: Arraycomm, Incorporated, Santa Clara, Calif.

[21] Appl. No.: 283,470

[22] Filed: Aug. 1, 1994

Related U.S. Application Data

[63] Continuation-in-part of Ser. No. 806,695, Dec. 12, 1991, Pat. No. 5,515,378.

[51] Int. Cl.[6] ............................... H04B 7/00; H04Q 3/02
[52] U.S. Cl. ..................... 455/38.1; 455/53.1; 455/51.1
[58] Field of Search ............................ 455/38.1, 53.1, 455/51.1; 340/825.44, 825.49

[56] References Cited

U.S. PATENT DOCUMENTS

| | | |
|---|---|---|
| 3,704,465 | 11/1972 | Masak et al. . |
| 3,774,209 | 11/1973 | Fleming et al. . |
| 3,798,645 | 3/1974 | Baurle et al. . |
| 3,852,749 | 12/1974 | Kohler . |
| 4,085,319 | 4/1978 | Dietz et al. . |
| 4,626,859 | 12/1986 | Stansfield . |
| 4,737,794 | 4/1988 | Jones . |
| 4,742,356 | 5/1988 | Kuipers . |
| 4,750,147 | 6/1988 | Roy, III et al. ........................... 364/807 |
| 4,940,963 | 7/1990 | Gutman et al. ...................... 340/825.44 |
| 4,965,732 | 10/1990 | Roy, III et al. . |
| 5,052,799 | 10/1991 | Sasser et al. . |
| 5,124,697 | 6/1992 | Moore ................................... 340/825.44 |
| 5,159,593 | 10/1992 | D'Amico et al. . |

OTHER PUBLICATIONS

Friedlander et al., Direction Finding for Wideband Signals Using an Interpolated Array, 1991, IEEE 1058-6393/91, pp. 583-587.

*Primary Examiner*—Reinhard J. Eisenzopf
*Assistant Examiner*—Marsha D. Banks-Harold
*Attorney, Agent, or Firm*—Townsend and Townsend and Crew LLP; Henry K. Woodward

[57] ABSTRACT

An improved radio paging system providing automatic acknowledgment of message delivery, including a base station with spatially directive reception means and a pager capable of transmitting acknowledgment signals. The spatially directive reception means at the base station enhances the reception quality of the acknowledgment signals transmitted by the pager over that obtainable with conventional omnidirectional reception means, thereby compensating for the disparity in the base station and pager transmission powers.

10 Claims, 10 Drawing Sheets

SPECTRALLY EFFICIENT AND HIGH CAPACITY ACKNOWLEDGEMENT RADIO PAGING SYSTEM

CROSS-REFERENCES TO RELATED APPLICATIONS

This patent application is a continuation in part of application Ser. No. 07/806,695, filed 1991 Dec. 12 for "Spatial Division Multiple Access Wireless Communication Systems now U.S. Pat. No. 5,515,378."

BACKGROUND OF THE INVENTION

1. Field of the Invention

This invention relates to radio paging systems, and more particularly the invention relates to systems that implement an automatic mechanism for the confirmation of receipt of a paging message.

2. Discussion of Prior Art

The term "radio paging" refers to services in which messages, or "pages", are transmitted via radio, throughout a particular geographic area, to "pagers" in the possession of subscribers to this service. In the current art, these messages are broadcast digitally and contain short numeric (e.g. a phone number) or alphanumeric messages with length limitations on the order of tens of characters.

A representative architecture for a paging system is depicted in FIG. 1. A page is initiated by a telephone or computer modem call through a wide area network interface 1, typically provided by the local telephone company, to the paging service provider's offices. This initial call specifies the message content and the address of the pager for which the message is intended. A paging controller 2 transmits the information associated with each page, via paging control links 3 (a,b,c), to base stations 5 (a,b,c) serving the target pager's geographic area. Each base station is responsible for providing radio paging coverage throughout a particular paging cell. Cell boundaries 4 (a,b,c) are determined by regulatory limits on emitted radio frequency energy and by local propagation effects. Information on pager locations is not maintained by the system. Each page is therefore broadcast omnidirectionally by all base stations in the target pager's geographic area in an attempt to assure successful delivery of the page. Users equipped with pagers are identified by a boxed "U" in the figure. Pagers continually monitor the base stations' transmission frequencies, and, when a pager detects a message incorporating its own address, that pager receives the message and displays it, most usually on an integral liquid crystal display or similar device. FIG. 2 depicts a pager 7 with integral display 8 and control keys 9 (a, . . . ,d).

Radio paging, as described above, has the following three key deficiencies:

a) It is impossible for the paging system to determine whether or not a page has been received. A target pager might be outside the coverage area of the paging system, for example, or it might not be operating at the time that the page is transmitted.

b) Existing paging systems provide no mechanism for direct subscriber response to a page. Most pages require some sort of response, but, in the current art, the subscriber must employ an alternative means of communication (e.g. a telephone call) to supply a response.

c) Page message lengths are constrained to tens of bytes, limiting the utility of the paging system for detailed or lengthy messages.

Deficiencies (a) and (b), above, stem from the unidirectional nature of the message flow in the system. Deficiency (c) stems from the paging provider's business need to serve a large number of customers in combination with limited spectrum availability and an omnidirectional radio transmission strategy.

SUMMARY OF THE INVENTION

Accordingly, several of the objects and advantages of the present invention are:

a) to provide a paging system in which message receipt is automatically confirmed;

b) to provide a paging system in which a subscriber can directly respond to paging messages by means of their pager;

c) to provide a paging system in which message lengths are constrained to thousands, rather than tens, of bytes;

d) to provide a paging system in which directive reception and directive transmission are employed at the base station to increase both the system capacity and achievable transmission rates beyond what is achievable with omnidirectional transmission and reception strategies;

e) to provide a paging system in which automatic confirmation of message receipt is implemented with inexpensive, lightweight, compact pagers;

f) to provide a paging system in which automatic confirmation of message receipt is implemented without auxiliary reception sites for data transmitted by the pager; and g) to provide a paging system with the preceding objects and advantages which is compatible with pagers that have no means for generating an acknowledgment, in particular pagers such as are employed in conventional paging systems in which automatic confirmation of message receipt does not occur.

Still further objects and advantages will become apparent from a consideration of the ensuing description and drawings.

LIST OF REFERENCE NUMERALS

Figure 1:
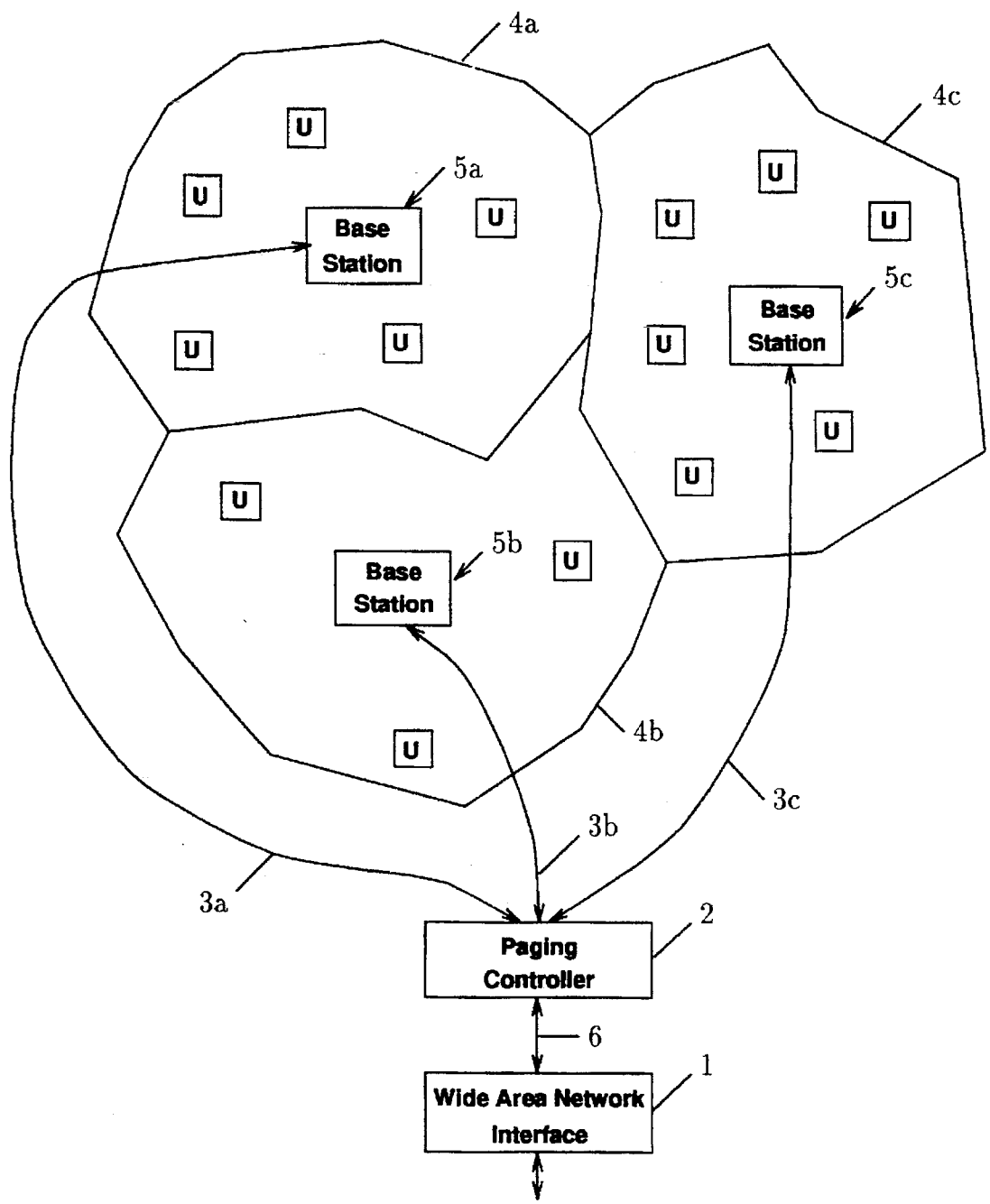
FIG. 1 depicts an entire paging system including an external network interface, paging controller, base stations and users equipped with pagers.
Figure 2:
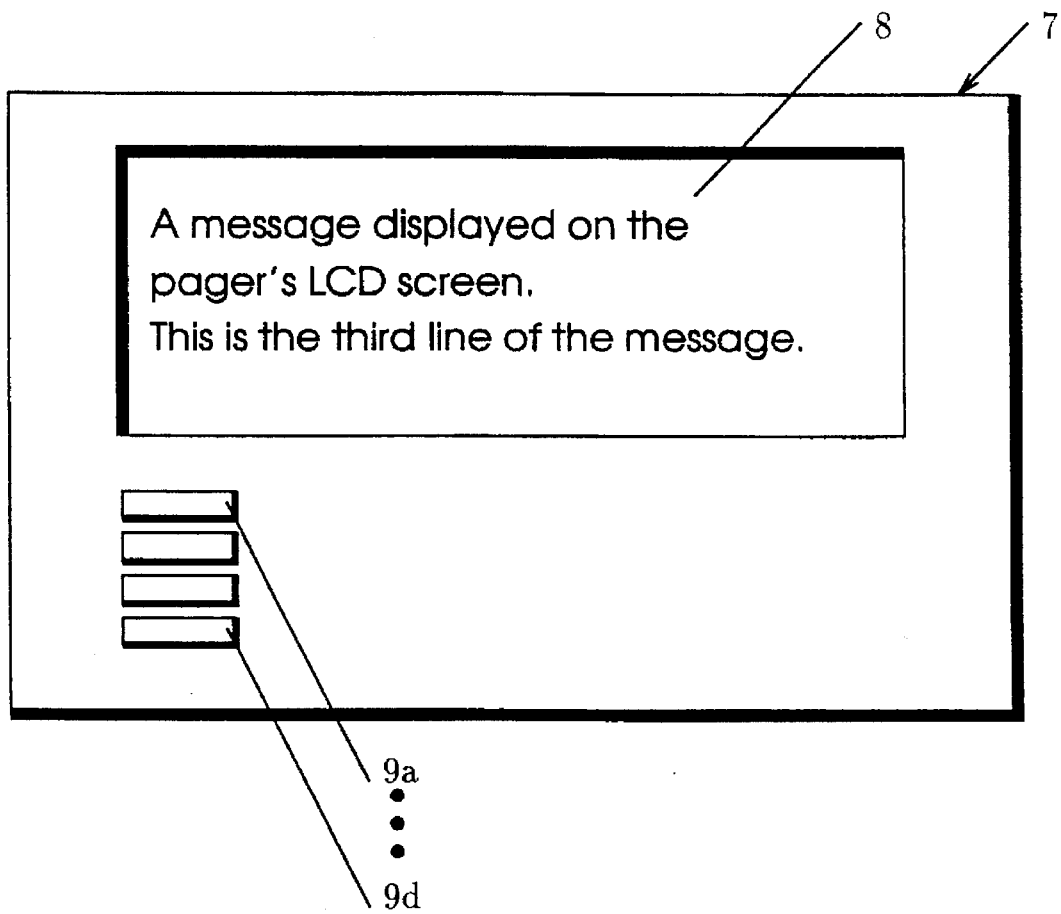
FIG. 2 depicts a pager.

1. Wide area network interface
2. Paging controller
3a. Paging control link

3b. Paging control link
3c. Paging control link
4a. Paging cell boundary
4b. Paging cell boundary
4c. Paging cell boundary
5a. Paging base station
5b. Paging base station
5c. Paging base station
6. High speed message link
7. Pager
8. Pager liquid crystal display
9a. Pager control button
9d. Pager control button
10. Base station controller
11. Demodulated received signal
12. Spatially demultiplexed received signal
13. Received signals
14. Demultiplexing weights
15. Data to be transmitted directionally
16. Modulated signal to be multiplexed for transmission
17. Modulated, spatially multiplexed signals to be transmitted
18. Multiplexing weights
19. Spatial processor
20. Spatial controller
21. Messages to be omnidirectionally transmitted
22. Broadcast modulator/transmitter
23. Multichannel transmitters
24. Multichannel receiver
25a. Multichannel receiver
25m. Multichannel receiver
26a. Multichannel transmitter
26m. Multichannel transmitter
27. Omnidirectional transmission antenna
28a. Transmission antenna
28m. Transmission antenna
29a. Reception antenna
29m. Reception antenna
30. Spatial demultiplexer
31. Spatial multiplexer
32. Signal modulator
33. Signal demodulator
34. Spatial control data
35. Spatial parameter data
36. Common receiver oscillator
37. Received data buffer
38. Delayed received signals
39. Receiver control data
40. Transmitter control data
41. Common transmitter oscillator
42. Pager antenna
43. Pager duplexer
44. Pager duplexer output
45. Pager receiver
46. Pager received signal
47. Pager demodulator
48. Pager demodulated received signal
49. Pager keyboard and keyboard controller
50. Pager keyboard data
51. Pager display data
52. Pager display and display controller
53. Pager modulator
54. Pager data to be transmitted
55. Pager modulated data to be transmitted
56. Pager transmitter
57. Pager transmitter output
58. Pager transmitter control data
59. Pager receiver control data
60. Pager central processing unit

DESCRIPTION OF THE SPECIFIC EMBODIMENT

Figure 3:
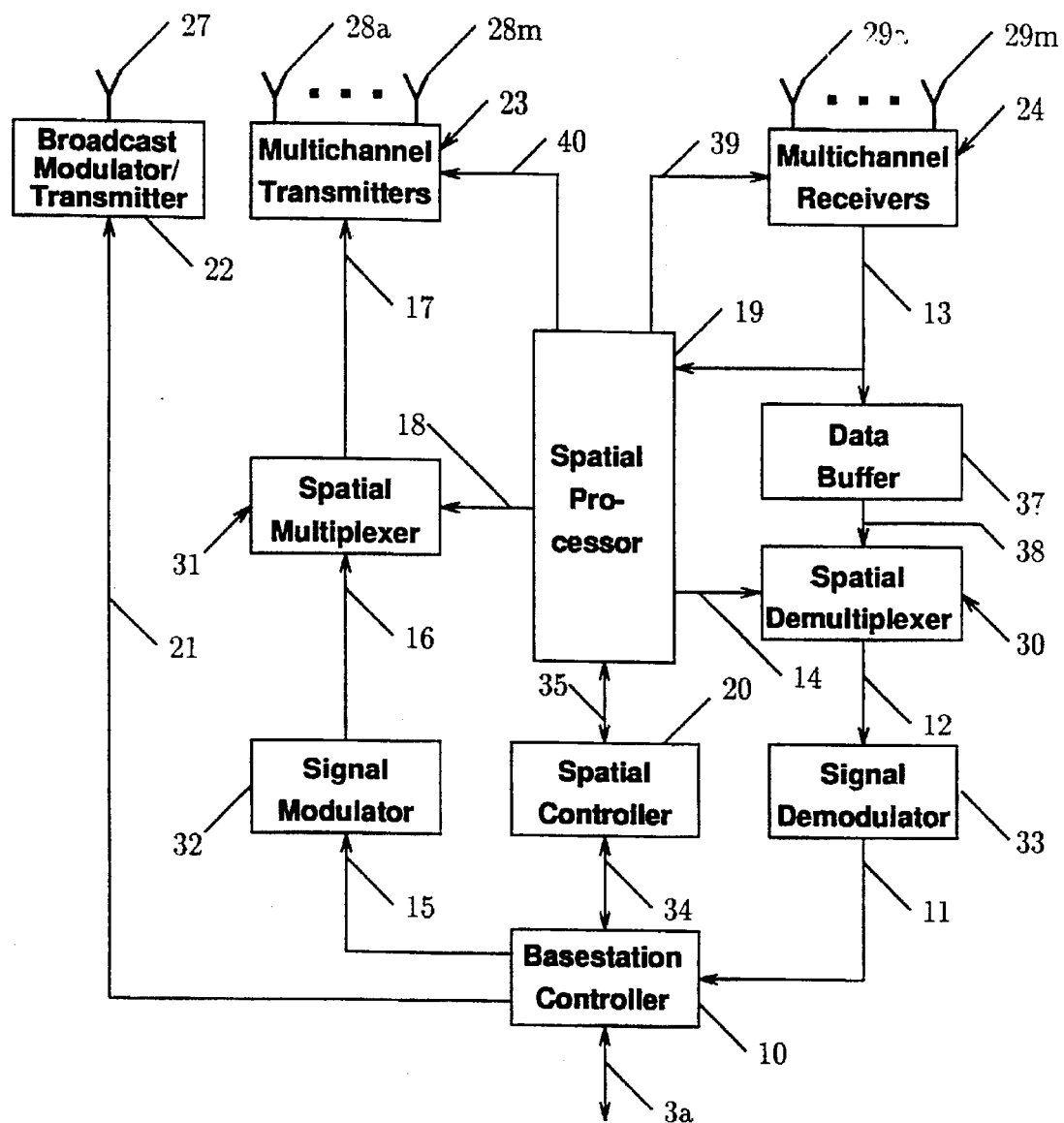
FIG. 3 depicts a base station capable of transmitting pages and receiving acknowledgments from pagers in accordance with the invention.

FIG. 3 depicts a preferred embodiment of base station apparatus in accordance with the invention. A paging control link 3a carries messages between the base station equipment and the paging controller. These messages consist of instructions for the base station to issue a page, and indications to a paging controller 2 that the base station has successfully delivered a page or that the base station was unable to deliver a particular page. A base station controller 10 acts as the interface between the base station and paging control link 3a, and serves to coordinate the overall operation of the base station. Base station controller 10 is implemented with a conventional central processing unit along with memory and interfaces to paging control link 3a.

Three classes of radio messages are distinguished in the system, and base station controller 10 serves as a nexus for all radio messages. The first class consists of messages that are broadcast omnidirectionally from the base station. There are two messages in this class: pages intended for conventional pagers that are unable to provide acknowledgment, and message channel assignment messages for pagers capable of providing message acknowledgment. Baseband messages in this class 21 are communicated to an omnidirectional broadcast modulator/transmitter 22 which, in turn, drives an omnidirectional transmission antenna 27.

Figure 4:
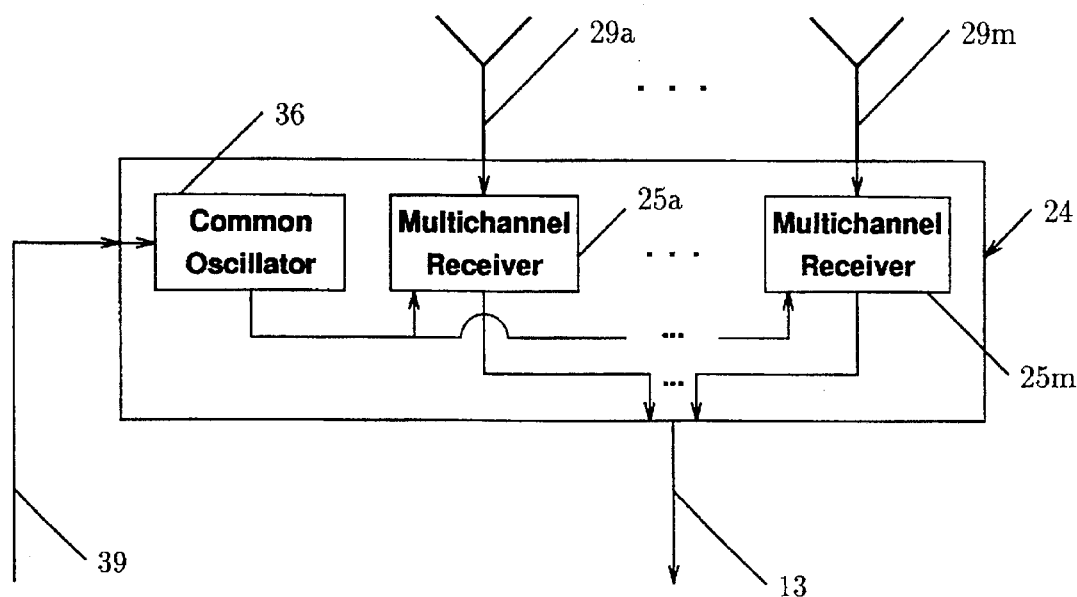
FIG. 4 depicts coherent multichannel receivers and their respective antennas as used in the invention.

The second class of radio messages consists of acknowledgments transmitted by pagers and directionally received at the base station. These messages consist of data identifying the originating pager and either an acknowledgment or data specified by the operator of the pager in response to a page. These radio transmissions impinge on a number, m, of reception antennas $29(a, \ldots, m)$ each of whose output is connected to one of m multichannel receivers in a bank of phase-coherent multichannel receivers 24. FIG. 4 depicts individual multichannel receivers $25(a, \ldots, m)$ with antenna connections, a common local receiver oscillator 36, and digital outputs. In the present embodiment, multichannel receivers $25(a, \ldots, m)$ all operate on a single common frequency band. In an alternate embodiment, multichannel receivers $25(a, \ldots, m)$ operate on a common multiplicity of frequency bands. Common local receiver oscillator 36 ensures that the signals from reception antennas $29(a, \ldots, m)$ are coherently down-converted to baseband; its frequency is controlled by a spatial processor 19 (FIG. 3) via receiver control data 39. Referring again to FIG. 3, received signals 13 from each multichannel receiver $25(a, \ldots, m)$ are available to spatial processor 19 and to a received data buffer 37. Received data buffer 37 consists of m parallel "first-in first-out" arrangements of digital memory producing delayed received signals 38 which are delayed, but otherwise identical, copies of received signals 13.

Spatial processor 19 consists of a central processing unit and receives received signals 13 and certain spatial parameter data 35 from a spatial controller 20. Spatial processor 19 produces certain spatial parameter data 35, spatial demultiplexing weights 14, spatial multiplexing weights 18, receiver control data 39 and transmitter control data 40.

Figure 5:
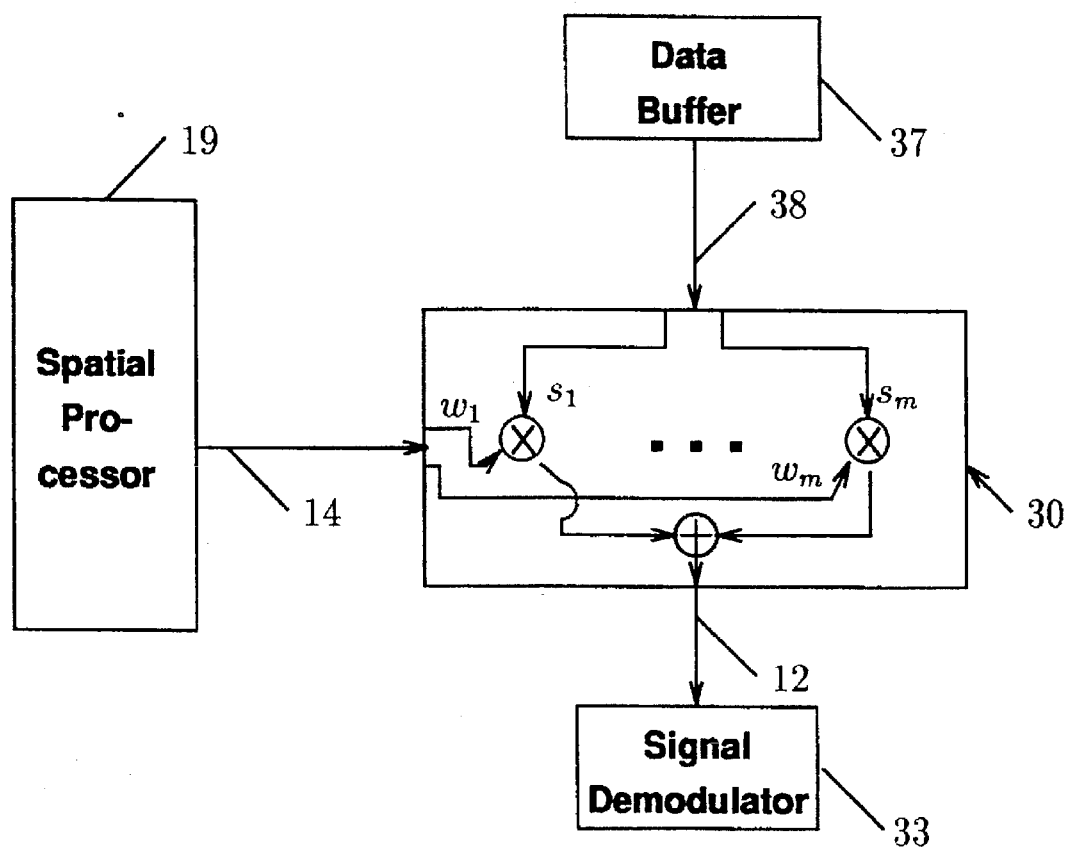
FIG. 5 depicts a spatial demultiplexer as used in the invention.

A spatial demultiplexer 30 linearly combines delayed received signals 38, according to spatial demultiplexing weights 14 as depicted in FIG. 5. Arithmetic operations in spatial demultiplexer 30 are carried out using general purpose arithmetic chips. The notations "$s_1$" and "$s_m$" in the figure denote the first and $m^{th}$ signal components of delayed received signals 38, respectively. The notations "$w_l$" and "$w_m$" in the figure denote the first and $m^{th}$ weight components of spatial demultiplexing weights 14, respectively. Referring again to FIG. 3, the output of spatial demultiplexer 30 is a spatially demultiplexed received signal 12 which is demodulated by a signal demodulator 33 producing a demodulated received signal 11. Demodulated received signal 11 and corresponding spatial control data 34 are available to base station controller 10.

The third class of radio messages consists of paging data (i.e. the page, itself) which are directionally transmitted from the base station to the pager. Base station controller 10 in FIG. 3 provides data to be transmitted 15 to a signal modulator 32, and associated spatial control data 34 to spatial controller 20. The output of signal modulator 32 is a modulated signal to be multiplexed for transmission 16.

Figure 6:
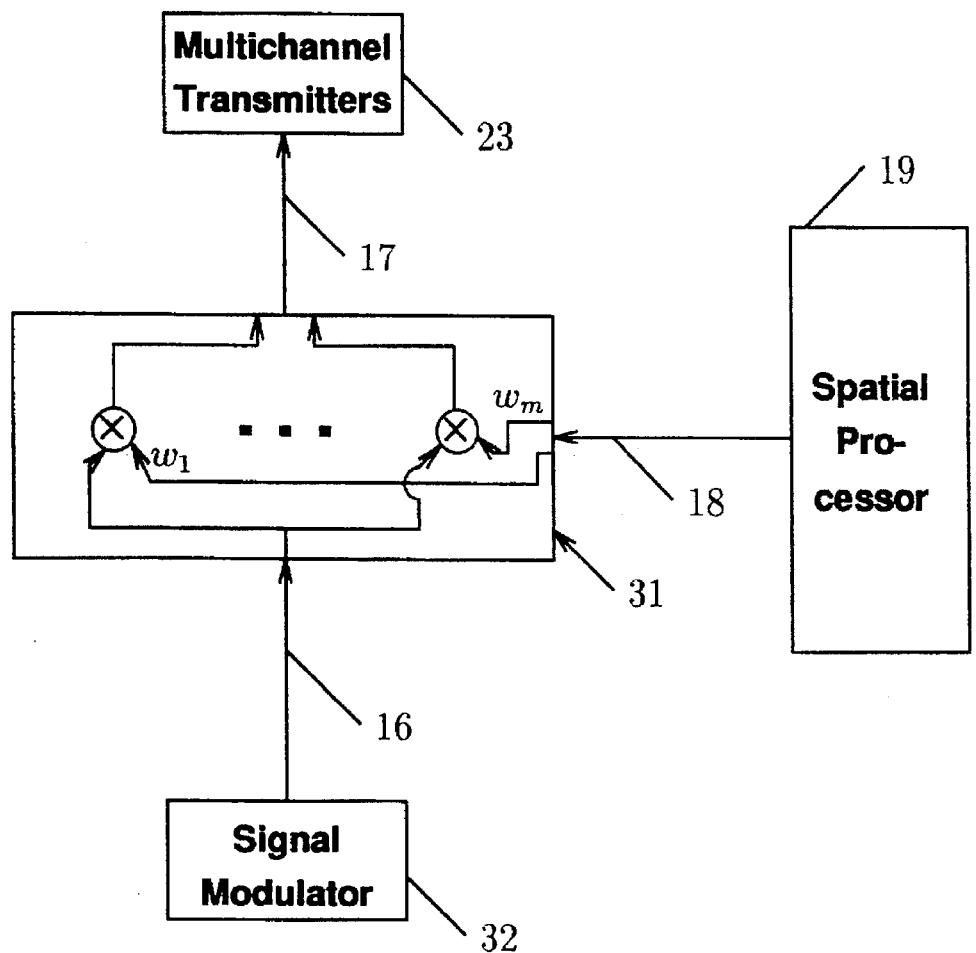
FIG. 6 depicts a spatial multiplexer as used in the invention.
Figure 7:
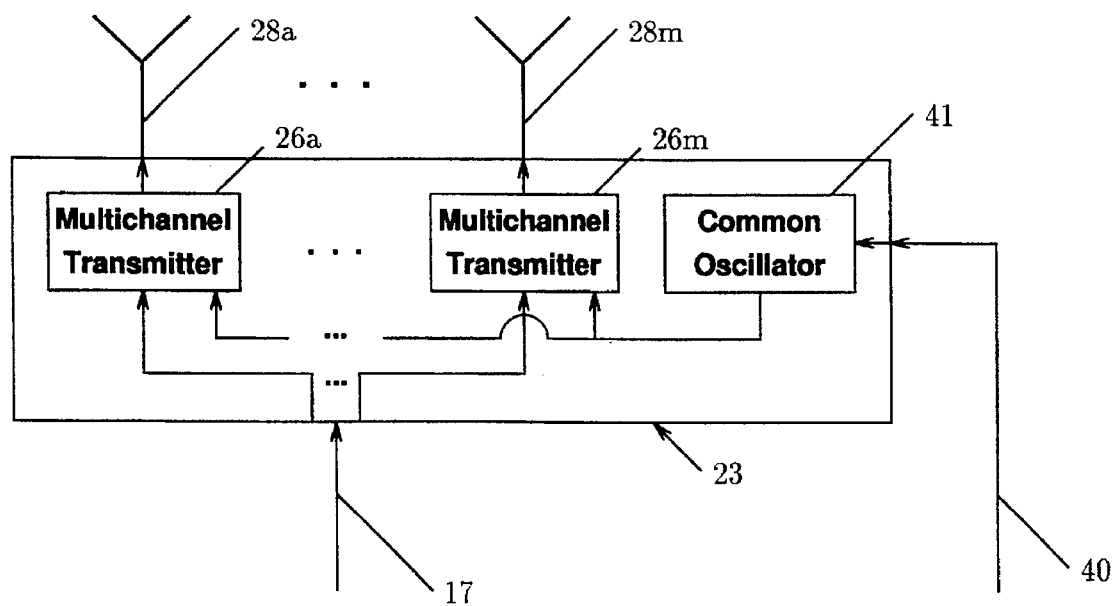
FIG. 7 depicts coherent multichannel transmitters and their respective antennas as used in the invention.

Modulated signal 16 and a set of spatial multiplexing weights 18 are combined in a spatial multiplexer 31 to produce m weighted versions of modulated signal 16 as depicted in FIG. 6. The notations "$w_l$" and "$w_m$" in the figure denote the first and $m^{th}$ weight components of spatial multiplexing weights 18, respectively. These weighted signals constitute a collection of modulated and spatially multiplexed signals to be transmitted 17. Arithmetic operations in spatial multiplexer 31 are carried out using general purpose arithmetic chips. Modulated and spatially multiplexed signals 17 are inputs to a bank of m phase coherent multichannel transmitters 23. FIG. 7 depicts individual multichannel transmitters 26($a, \ldots, m$) with antenna connections, a common local transmitter oscillator 41, and digital inputs. In the present embodiment, multichannel transmitters 26($a, \ldots, m$) all operate on a single common frequency band. In an alternate embodiment, multichannel transmitters 26($a, \ldots, m$) operate on a common multiplicity of frequency bands. Common local transmitter oscillator 41 ensures that the relative phases of spatially multiplexed signals 17 are preserved during transmission by transmission antennas 28($a, \ldots, m$). The frequency of common local transmitter oscillator 41 is controlled by spatial processor 19 (FIG. 3) via transmitter control data 40.

Figure 8:
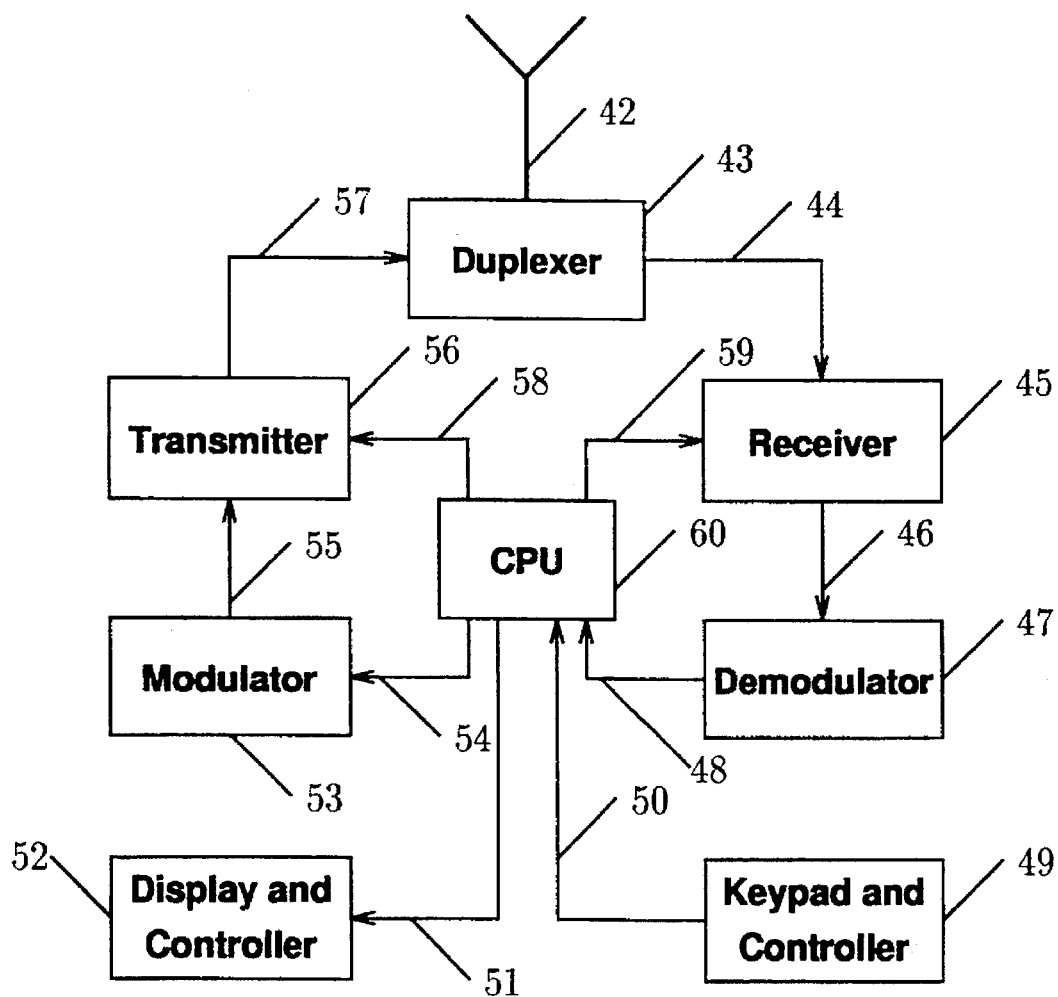
FIG. 8 depicts internal functional blocks of a pager capable of receiving pages and generating acknowledgments in accordance with one embodiment of the invention.

FIG. 8 depicts the component arrangement in pager 7. A pager antenna 42 is connected to a pager duplexer 43 to permit pager antenna 42 to be used for both pager transmission and reception. In one alternate embodiment, pager duplexer 43 would be replaced by a transmit-receive switch. A pager duplexer output 44 serves as input to a pager receiver 45. Pager receiver 45 produces a down-converted signal 46 which is the input to a pager demodulator 47. A pager demodulated received signal 48, estimated message bits, serves as one input to a pager central processing unit 60. Pager central processing unit 60 is implemented with a standard microprocessor. Pager central processing unit 60 also produces pager receiver control data 59 for selecting the pager's reception channel, pager transmitter control data 58 for selecting the pager's transmission channel, pager data to be transmitted 54, and pager display data 51 for a pager display and display controller 52. Pager central processing unit 60 also receives pager keyboard data 50 from a pager keyboard and keyboard controller 49. Pager data to be transmitted 54 is input to a pager modulator 53 producing a pager modulated signal to be transmitted 55. Pager modulated signal to be transmitted 55 is up-converted and amplified in a pager transmitter 56, producing a pager transmitter output 57. Pager transmitter output 57 is then input to pager duplexer 43.

Figure 9A:
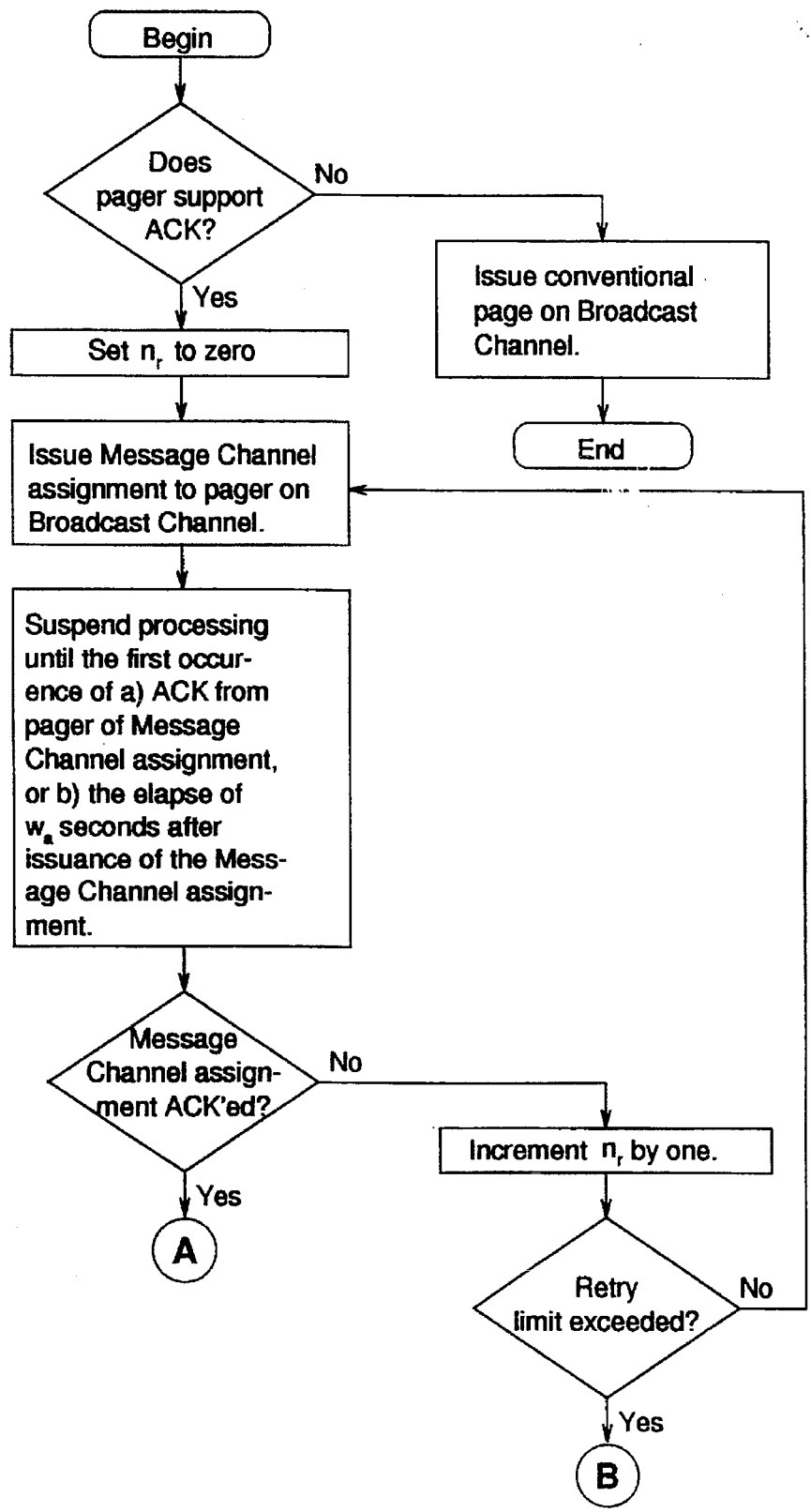
FIGS. 9A and 9B depict portions of the flow of operations as required to effect pages to pagers capable of automatic acknowledgment and to pagers not possessing that capability in accordance with the invention.
Figure 9B:
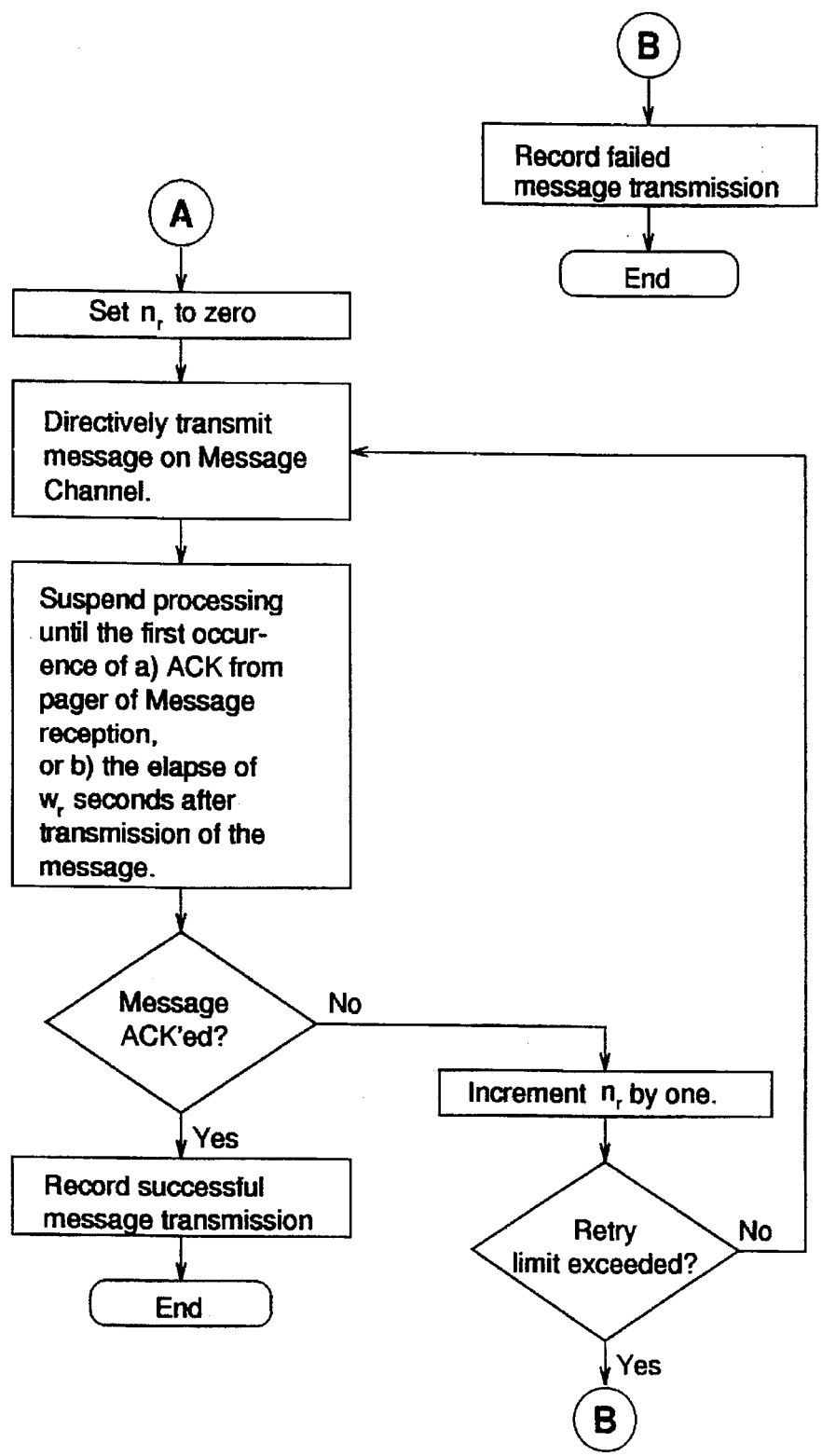

Operation of Invention:

General Principles—Base Station:

Paging base station 5a (FIG. 3), along with other paging base stations in the system, processes many pages simultaneously. FIGS. 9A and 9B provide a flow chart for the processing of a page at base station 5a, thereby illustrating the general operating principles of the invention. Instructions to issue a page are delivered to base station 5a over paging control link 3a. Each such instruction includes a numeric identifier that uniquely specifies the pager that is to be the recipient of the message, an indication as to whether the targeted pager is capable of generating an acknowledgment, and the data to be transmitted to the targeted pager. Processing then proceeds from the block labeled "Begin" in FIG. 9A.

If the instructions for this page indicate that the targeted pager is incapable of generating an acknowledgment (i.e., it is a conventional pager), base station controller 10 passes the pager identifier and the data to be broadcast to broadcast modulator/transmitter 22 for omnidirectional broadcast, ending the paging cycle for this type of page.

The radio channel employed by broadcast modulator/transmitter 22 will be referred to as the "broadcast channel" in the sequel. Similarly, the radio channels employed by multichannel transmitters 23 will be referred to as "message channels", and those employed by multichannel receivers 24 will be referred to as "acknowledgment channels".

If, on the other hand, the instructions for the page indicate that the targeted pager is capable of generating an acknowledgment, a different paging cycle ensues, as depicted in the flow chart. In this case, base station controller 10 prepares a message channel assignment message and passes the data for this message, which includes the targeted pager's identifier, to broadcast modulator/transmitter 22 for omnidirectional broadcast on the broadcast channel. The purpose of the message channel assignment message is to command the target pager to tune to the specified message channel for the remainder of the paging cycle. Each message channel has an associated acknowledgment channel.

Immediately following the issuance of this message channel assignment message, base station controller 10 initializes a retry counter, the value of which is denoted by $n_r$, to zero, and a timer which generates an alarm after the passage of $w_a$ seconds. If that alarm occurs prior to the receipt of a corresponding acknowledgment (abbreviated to "ACK" in the flow chart), $n_r$ is incremented by one; and, if a pre-specified limit on the number of retry attempts for a message channel assignment has not been exceeded, the message channel assignment message is resent. If the retry attempt limit has been exceeded, the page is considered unsuccessful and the paging cycle terminates as indicated in the flow chart.

Simultaneously with the issuance of the message channel assignment message, base station controller 10 alerts spatial controller 20 that an acknowledgment is expected on the selected acknowledgment channel. Spatial controller 20 provides this information to spatial processor 19 which then selects the current acknowledgment channel by providing appropriate receiver control data 39 to multichannel receivers 24. Spatial processor 19 then monitors received signals 13 to detect the presence of the pager's acknowledgment and to estimate the pager's direction with regard to base station 5a. When an incoming acknowledgment is detected, spatial processor 19 calculates and provides appropriate demultiplexing weights 14 to spatial demultiplexer 30 and, simultaneously, provides the pager's direction to base station controller 10, via spatial controller 20, for association at base station controller 10 with demodulated pager acknowledgment 11 generated by signal demodulator 33. Descriptions of the operations performed internally by spatial processor 19, spatial demultiplexer 30, and spatial multiplexer 31 are provided later in this section.

Having received the pager's acknowledgment and direction relative to base station 5a, as shown in FIG. 3 base station controller 10 supplies message data 15 for the page to signal modulator 32 and, simultaneously, supplies the associated pager's direction and message channel to spatial controller 20. The pager's direction and message channel are then supplied to spatial processor 19. Spatial processor 19 provides transmitter control data 40 to multichannel transmitters 23 to set the message channel. Spatial processor 19 also generates spatial multiplexing weights 18 for spatial multiplexer 31 corresponding to the pager's direction. Modulated, spatially multiplexed signals 17 are thereby provided to multichannel transmitters 23 for transmission from transmission antennas 28($a, \ldots, m$).

Immediately following transmission of the message portion of the page, spatial processor 19 issues receiver control data 39 to multichannel receivers 24 causing multichannel receivers 24 to tune to the corresponding acknowledgment channel. Simultaneously, spatial processor 19 provides appropriate demultiplexing weights 14 to spatial demultiplexer 30 for directional reception of a pager-generated acknowledgment of the message portion of the page. Base station controller 10 monitors demodulated received signal 11 for the pager acknowledgment.

Base station controller 10, immediately following issuance of the message data transmission for a particular page, initializes a retry counter as shown in FIG. 9B, the value of which is denoted by $n_r$, to zero, and a timer which generates an alarm after the passage of $w_r$ seconds. If that alarm occurs prior to the receipt of an acknowledgment (abbreviated to "ACK" in the flow chart) from the target pager, as determined by monitoring of demodulated received signal 11, $n_r$ is incremented by one. If a pre-specified limit on the number of retry attempts for a message data transmission has not been exceeded, the message data transmission and acknowledgment cycle, as described in the preceding two paragraphs, is repeated. If the retry attempt limit has been exceeded, the page is considered unsuccessful and the paging cycle terminates as indicated in the flow chart. If an acknowledgment from the targeted pager is received before the number of retry attempts has been exceeded, however, the page is considered successful and the paging cycle terminates. In all instances when the target pager is capable of generating acknowledgments, base station controller 10 apprises paging controller 2 of the success of the page via paging control link 3a. If base station controller 10 considers the page to have been a success, it also apprises paging controller 2 of the target pager's estimated location.

General Principles—Pager:

The preceding paragraphs describe the paging cycle as executed at base station 5a. The complementary operations performed by pager 7 are now described with reference to FIG. 8. Pager 7 operates in a standby mode whenever it is not actively processing a page. In this standby mode, pager receiver 45 is tuned to one or more well-known paging frequencies by pager central processing unit 60 enabling pager demodulator 47 to demodulate all message channel assignment messages. Pager central processing unit 60 parses these demodulated messages, remaining in this standby mode unless it detects its own unique numeric identifier in one of the messages.

Upon detection of its own unique numeric identifier in a message channel assignment message, pager central processing unit 60 tunes pager transmitter 56 to the corresponding acknowledgment radio channel, and passes an acknowledgment message containing its own unique numeric identifier to pager modulator 53 for transmission via pager antenna 42. Pager central processing unit 60 then tunes pager receiver 45 to the assigned message channel by producing appropriate pager receiver control data 59. Pager central processing unit 60 simultaneously initializes a timer which generates an alarm at the end of an interval commensurate with the values of $w_r$ and the message transmission retry attempt limit employed by base station controller 10 as described above. If the alarm occurs before pager central processing unit 60 detects a complete message transmission in pager demodulated received signal 48, pager 7 returns to standby mode. If, on the other hand, pager central processing unit 60 detects a complete message transmission in pager demodulated received signal 48, pager central processing unit 60 transmits a second acknowledgment in the manner described above. Once this acknowledgment has been transmitted, pager central processing unit 60 downloads the demodulated message data to pager display and display controller 52 for display, and returns to standby mode.

While in standby mode, pager keyboard and keyboard controller 49 may be used to cause pager central processing unit 60 to issue commands to pager display and display controller 52 causing the display to "scroll" through any messages stored at pager 7.

Spatial Processing—Base Station:

Spatial processing at base station 5a (FIG. 3) is conducted using the methods described in co-pending application Ser. No. 07/806,695, supra 2. The operations performed by spatial processor 19 are described therein, as is the operation of spatial multiplexer 31 and the operation of spatial demultiplexer 30. Also described therein, are methods for effecting simultaneous paging cycles for multiple target pagers with a single acknowledgment and message channel pair, and for effecting simultaneous paging cycles for multiple target pagers on multiple acknowledgment and message channel pairs.

In contrast to the invention described in the co-pending application, received data buffer 37 effects a digital delay line for received signals 13 of duration equal to the time period for spatial updates in spatial processor 19. Demultiplexing weights 14 are thereby applied to the identical time period of received signals 13 employed for spatial environment estimation. This signal processing strategy is necessitated by the short time duration of acknowledgment messages generated by pager 7.

Alternate Embodiments
Shared Transmit and Receive Arrays:

In one alternate embodiment, transmission antennas 28($a, \ldots, m$) and reception antennas 29($a, \ldots, m$) at base station 5a are replaced by a single array of m antennas. Each element in this array is attached to both its respective component of multichannel transmitters 23 and its respective component of multichannel receivers 24 by means of a duplexer.

Omnidirectional Message Channel:

In one alternate embodiment, message channel transmissions are performed in an omnidirectional fashion rather than in the directional fashion described above. In this embodiment, spatial multiplexer 31, multichannel transmitters 23 and transmission antennas 28($a, \ldots, m$) are replaced by a single transmitter and antenna. Base station controller 10 issues appropriate transmitter control information 40 in this embodiment.

Broadcast Channel Transmitted from an Array Element:

In one alternate embodiment, broadcast channel transmissions are performed using one of transmission antennas 28($a, \ldots, m$). In this embodiment, the respective multichannel transmitter 26$a$, for example, has an output power rating comparable to that of broadcast modulator/transmitter 22 which is typically $m^2$ greater than that of the other m−1 multichannel transmitters in the array. In one such embodiment, broadcast channel transmissions and message channel transmissions are interleaved. In another such embodiment, broadcast channel transmissions and message channel transmissions are performed simultaneously.

In this embodiment, broadcast modulator/transmitter 22 and omnidirectional transmission antenna 27 are eliminated from base station 5$a$.

Swept Page:

In one alternate embodiment, broadcast channel messages are transmitted using all of transmission antennas 28($a, \ldots, m$). Broadcast channel messages to be transmitted are placed in a "first-in, first-out" queue. Spatial processor 19 transmits these broadcast channel messages by creating a directional beam (an array transmission pattern which is designed to concentrate transmitted radio frequency energy in a narrow angular sector and to minimize transmitted energy outside of that sector, as is well known in the art of phased antenna arrays) and transmitting the first paging message in the queue by means of the beam. Following that transmission a new directional beam, covering the next angular sector of approximately the same angular width in a clockwise direction, is created and the paging message is transmitted again. This process is repeated until the earlier of the page's transmission throughout the base station's coverage region or the receipt of an acknowledgment from the target pager. If additional broadcast channel messages are in the queue, the next message is then extracted from the queue and transmitted using the same strategy. This "swept page" strategy can occur simultaneously with the delivery of message channel messages described in the primary embodiment. In addition, if multiple broadcast channels are employed, swept pages can be performed simultaneously, on all broadcast channels.

In this embodiment, broadcast modulator/transmitter 22 and omnidirectional transmission antenna 27 are eliminated from base station 5$a$.

User Equipment:

In one alternate embodiment, the user equipment is more general than pager 7. The user equipment in this case is a "personal organizer", "personal digital assistant", or laptop computer incorporating, through a combination of software and hardware, equivalent functionality to pager 7. This user equipment could additionally support the transmission and reception of message data other than alphanumeric messages, as is well known in the art. These other types of data might include digitized voice and facsimile data. PCM-CIA cards and associated software serving this purpose are currently available for existing paging systems.

Message Acknowledgments Incorporating User Responses:

In one alternate embodiment, users can cause one of several predetermined responses to be incorporated in the message acknowledgment generated by pager 7. In this embodiment, each message transmitted to the pager includes a list of possible responses selected by the originator of the message. Pager 7, detecting the presence of this list in the data transmitted to it, presents the list to the user via pager display and display controller 51. Using pager keypad and keypad controller 49, the user indicates which item from the fixed list of responses is to be returned with the acknowledgment. The index of this item is encoded in the acknowledgment and, at base station 5$a$, this index is provided to paging controller 2 via paging control link 3$a$, along with a unique identifier for the target pager.

Pager Message Initiation:

In one alternate embodiment, pager 7 can initiate a page. Using pager keypad and keypad controller 49, the user enters the unique identifier of the recipient's communications equipment and the message data. Pager 7 then transmits a message on the acknowledgment channel indicating that it wishes to send a page, this message is received directionally by base station 5$a$. Upon receipt of this request, base station 5$a$ directionally transmits an acknowledgement to the originating pager on the message channel. Upon receipt of this acknowledgment, pager 7 transmits the message data and unique identifier of the recipient's pager on the acknowledgment channel. Upon receipt of this data, base station controller 10 forwards the message data and unique identifier of the recipient's communications equipment to paging controller 2 via paging control link 3$a$. The processing of this request for a page at paging controller 2 then proceeds in the usual fashion for a page request.

Pager Location Registration:

In one alternate embodiment, pager 7 associates itself with one of base stations 5($a,b,c$). In this embodiment, each of base stations 5($a,b,c$) periodically transmits a unique base station identifier on its respective broadcast channel. Pager 7 incorporates a general memory register for storing a base station identifier. Pager 7, upon being turned on, initializes this register to a reserved value used by no base station as its unique identifier. Following this initialization, whenever pager 7 is in the standby mode described above it decodes all base station identifiers that it detects in the broadcast channels which it is monitoring. In the event that pager 7 detects several identical and consecutive base station identifiers that differ from its internally stored base station identifier, pager 7 updates its internally stored base station identifier to this new detected value and transmits a message on the acknowledgment channel including its own unique identifier and the new base station identifier. Each of base stations 5($a,b,c$) which directionally receives this message, forwards the pager identifier and base station identifier contained in the message to paging controller 2 via its respective base station controller 10.

Use of Transaction Identifiers:

In one alternate embodiment, a short numeric transaction identifier is generated by base station controller 10 for each of the paging cycles depicted by the flowchart of FIGS. 9A and 9B. The only requirement on the values of the set of current transaction identifiers employed by base station controller 10 is that each active transaction identifier uniquely correspond to an active paging cycle. The transaction identifier is used in the following manner with pagers capable of generating an acknowledgment. The initial message channel assignment message depicted in FIG. 9A includes the transaction identifier along with the target pager's numeric identifier and message channel assignment. All subsequent transmissions for that particular paging cycle, emanating from either base station 5$a$ or the pager 7, are tagged with the assigned transaction identifier rather than the numeric identifier of pager 7 as described in the principal embodiment.

Thus, while the invention has been described in detail with reference to one embodiment, the description is illustrative of the invention and is not to be construed as limiting the invention. Various modifications and applications may occur to those skilled in the art without departing from the true spirit and scope of the invention as defined by the appended claims.

What is claimed is:

1. A base station for use in communicating with a pager unit comprising:
   a) transmitting means for transmitting broadcast data and message data to said pager unit;
   b) receiving means including a plurality of phase-coherent receivers and reception antennas for receiving transmissions from said pager unit;
   c) spatial processor means comprising a central processing unit for generating estimates of the direction of said pager unit and demultiplexing weights for use in a spatial demultiplexer from data produced by said receiving means;
   d) a received data buffer including parallel arrangements of digital memory, whereby data produced by said receiving means is aligned in time with said spatial demultiplexing weights employed in said spatial demultiplexer; and
   e) a base station controller including a central processing unit for controlling the functioning of equipment at said base station, facilitating communications with equipment outside of said base station, and implementing a radio protocol providing for the transmission of channel assignments to said pager unit and for exchanging message and acknowledgment data with said pager unit.

2. The base station of claim 1 wherein said transmitter means includes a single multichannel transmitter and associated antenna for the purpose of transmitting message data to said pager unit.

3. The base station of claim 2 wherein said radio protocol implemented by said base station controller allows initiation of a paging cycle from any terminus of the RF link including said base station and said pager.

4. The base station of claim 2 wherein said radio protocol implemented by said base station controller includes the broadcast of a unique base station identifier at predetermined intervals, whereby said pager unit may determine its best-serving base station.

5. The base station of claim 2 wherein said radio protocol implemented by said base station controller allows data created by an operator of said pager unit to be incorporated with said acknowledgment data in transmissions from said pager unit.

6. The base station of claim 1 wherein:
   a) said transmitter means includes a plurality of phase-coherent multichannel transmitters and transmission antennas for transmitting message data to said pager unit; and
   b) said spatial processor produces spatial multiplexing weights for use in a spatial multiplexer.

7. The base station of claim 6 wherein said phase-coherent multichannel transmitters and transmission antennas are employed for transmitting broadcast data by sequential transmissions over contiguous angular sectors.

8. The base station of claim 6 wherein said radio protocol implemented by said base station controller allows initiation of a paging cycle from any terminus of the RF link including said base station and said pager.

9. The base station of claim 6 wherein said radio protocol implemented by said base station controller includes the broadcast of a unique base station identifier at predetermined intervals, whereby said pager unit may determine its best-serving base station.

10. The base station of claim 6 wherein said radio protocol implemented by said base station controller allows data created by an operator of said pager unit to be incorporated with said acknowledgment data in transmissions from said pager unit.

* * * * *